United States Patent [19]
LaFountain et al.

[11] Patent Number: 6,000,308
[45] Date of Patent: Dec. 14, 1999

[54] SCREW DRIVE METHOD AND APPARATUS

[75] Inventors: Robert L. LaFountain, Scottsburg; Robert A. Carman, New Albany, both of Ind.

[73] Assignee: Flow International Corporation, Kent, Wash.

[21] Appl. No.: 09/046,500

[22] Filed: Mar. 23, 1998

[51] Int. Cl.$^6$ .................................................. B26F 3/00
[52] U.S. Cl. .................................. 83/53; 83/177; 83/618; 83/631
[58] Field of Search ............................. 83/523, 613, 618, 83/631, 177

[56] References Cited

U.S. PATENT DOCUMENTS

| | | | |
|---|---|---|---|
| 4,728,379 | 3/1988 | Audi et al. ................................. | 83/177 |
| 5,012,687 | 5/1991 | Hoshide ................................. | 74/89.15 |
| 5,013,164 | 5/1991 | Tsukada ................................. | 384/45 |
| 5,067,303 | 11/1991 | Brookman et al. ........................ | 83/177 |
| 5,170,675 | 12/1992 | Kawashima ............................. | 74/89.15 |
| 5,186,545 | 2/1993 | Shirai ................................... | 384/43 |
| 5,231,888 | 8/1993 | Katahira ............................. | 74/424.8 R |
| 5,248,202 | 9/1993 | Kawasugi et al. ........................ | 384/45 |
| 5,251,501 | 10/1993 | Katahira ............................... | 74/89.15 |
| 5,263,381 | 11/1993 | Shirai ................................... | 74/441 |
| 5,273,381 | 12/1993 | Shirai ................................... | 409/219 |
| 5,279,175 | 1/1994 | Kasuga et al. ........................... | 74/459 |
| 5,299,465 | 4/1994 | Kasuga ............................. | 74/424.8 R |
| 5,367,929 | 11/1994 | Burch et al. ............................. | 83/177 |
| 5,380,099 | 1/1995 | Teramachi ................................ | 384/45 |
| 5,487,609 | 1/1996 | Asada ................................... | 384/18 |
| 5,540,575 | 7/1996 | Takano et al. ........................ | 418/201.1 |
| 5,582,072 | 12/1996 | Yamaguchi et al. ...................... | 74/441 |
| 5,613,400 | 3/1997 | Sato et al. ............................. | 74/89.15 |
| 5,694,811 | 12/1997 | Tsukada ................................. | 74/467 |
| 5,697,252 | 12/1997 | Yamaguchi et al. ...................... | 74/441 |
| 5,722,294 | 3/1998 | Kobayashi et al. ................. | 74/424.8 NA |

*Primary Examiner*—M. Rachuba
*Attorney, Agent, or Firm*—Seed and Berry LLP

[57] ABSTRACT

A method and apparatus for operating a screw drive apparatus. The apparatus may include a threaded rod having a helical thread, a nut disposed about the threaded rod and having a load-bearing channel aligned with and radially outward from the helical thread, and a plurality of balls between the helical thread and the load-bearing channel. The apparatus may further include a housing with at least one support bearing having an inner race coupled to the nut and an outer race coupled to the housing and rotatable relative to the inner race. A retaining member is removably and adjustably coupled to the nut to apply an adjustable force against the support bearing in a direction generally parallel to a longitudinal axis of the threaded rod.

13 Claims, 4 Drawing Sheets

SCREW DRIVE METHOD AND APPARATUS

TECHNICAL FIELD

This invention relates to improved screw drive devices and methods for their operation.

BACKGROUND OF THE INVENTION

Screw drive mechanisms for converting rotational motion to linear motion are employed in a variety of applications, including cutting, machining, woodworking, and precision manufacturing, such as in silicon chip fabrication. Screw drives may offer improved reliability, speed, and accuracy over other types of drives, such as belt drives.

Conventional screw drive mechanisms, such as the device 10 shown in partial cross-section in FIG. 1, may include a threaded rod 11 with a helical thread 12 set at a given lead or pitch. Positioned on the threaded rod 11 is a nut 14 having a loadbearing channel 16 opposite the helical thread 12 of the threaded rod 11. A plurality of balls 18 are positioned between the load-bearing channel 16 and the helical thread 12. End caps 20 at the ends of the nut 14 contain ball return passages 22 that are aligned with the load-bearing channel 16. The nut 14 may be rotated relative to the threaded rod 11 (or vice versa) to impart linear motion to either the nut or the threaded rod. As the nut 14 and the threaded rod 11 rotate relative to each other, the balls 18 rotate relative to the nut and the threaded rod to reduce friction therebetween.

Conventional screw drive mechanisms may also include a housing 24 positioned radially outward from the nut 14 and coupled to the nut with support bearings 26, allowing the nut 14 to rotate freely within the housing 24. The support bearings 26 may include an inner race 32 adjacent the nut 14, an outer race 34 adjacent the housing 24 and a plurality of balls 19 between the inner race 32 and the outer race 34. Seals 28 are installed at opposite ends of the housing 24 to contain a lubricant between the housing 24 and the nut 14 for lubricating the support bearings 26. The housing 24 may then be attached to a device that is moved linearly relative to the threaded rod 11. For example, the housing may be attached to a table for positioning a machineable workpiece, or to a support arm for positioning a wate jet cutting nozzle.

Conventional screw drive mechanisms may have several disadvantages. For example, after extended use, the balls 19 and the inner and outer races 32 and 34 of the support bearings 26 may wear, causing these components to fit loosely together and resulting in reduced control over the position of the housing 24 relative to the threaded rod 11. Where the housing 24 is coupled to a waterjet cutting nozzle, the inability to accurately control the position of the housing may result in inaccurate cuts. Another disadvantage of conventional screw drive mechanisms is that it may be difficult to service individual components of the mechanism without disassembling the entire mechanism.

One approach to addressing wear in the components of the nut 14 has been to preload the balls 18. For example, U.S. Pat. No. 5,263,381 to Shirai discloses applying a preload force to the balls 18, to eliminate axial gaps between the balls, the helical thread 12 and the load-bearing channel 16. Similarly, U.S. Pat. No. 5,013,164 to Tsukada discloses a preload force for reducing vibration of a sliding member along a rail. However, none of the devices discussed above address the problem of a loose fit between the housing 24 and the nut 14 caused by wear in the support bearings 26. In fact, U.S. Patent No. 5,540,575 to Takuno et al. discloses that preloading face-to-face angular contact bearings may heat the bearings, causing them to seize.

SUMMARY OF THE INVENTION

The present invention is directed to methods and apparatuses for converting between rotational and linear motion with a screw drive mechanism. In one embodiment, the apparatus includes a threaded rod having a helical thread, and a nut disposed about the threaded rod and rotatable relative to the threaded rod. The nut has a channel aligned with and radially outward from the helical thread, and further has a plurality of balls between the helical thread and the channel. The apparatus may further include a drive shaft connected to the nut, and disposed about the threaded rod, and a housing disposed about the driveshaft. At least one support bearing having an inner race connected to the drive shaft and an outer race connected to the housing allows the housing to move linearly as the nut and drive shaft rotate relative to one another. A retaining member may be removably attached to the drive shaft to apply an adjustable force on the support bearing in a direction generally parallel to a longitudinal axis of the threaded rod.

In one embodiment, the retaining member threadably engages the drive shaft. In another embodiment, the retaining member engages the nut and the drive shaft may be eliminated. In still another embodiment, the housing may include two support bearings, each of which is compressed by the retaining member.

In still a further embodiment, the apparatus may include seals on opposite sides of the support bearing. The seals form a reservoir to maintain a supply of lubricant about the support bearing. The lubricant may also be deposited on the threaded rod through a weep port provided in the drive shaft, so as to lubricate the nut.

In yet a further embodiment, the threaded rod may include two nuts, each coupled to the other and coupled to the housing with a support bearing. The retaining member may be removably attached to the housing to apply an adjustable axial force to elements of both the support bearings and nuts.

DETAILED DESCRIPTION OF THE INVENTION

Figure 2A:
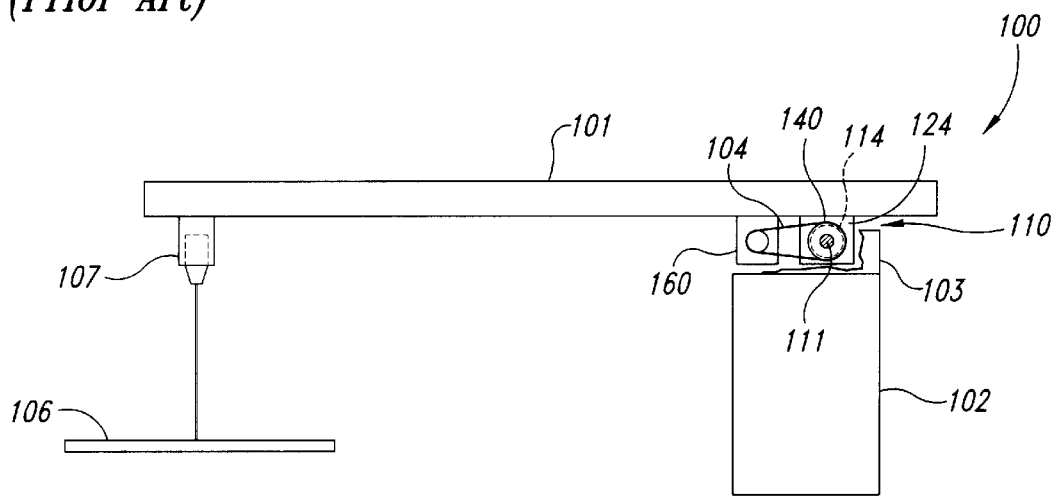
FIG. 2A is an end view of a waterjet cutting machine having a single screw drive apparatus in accordance with an embodiment of the invention.
Figure 2B:
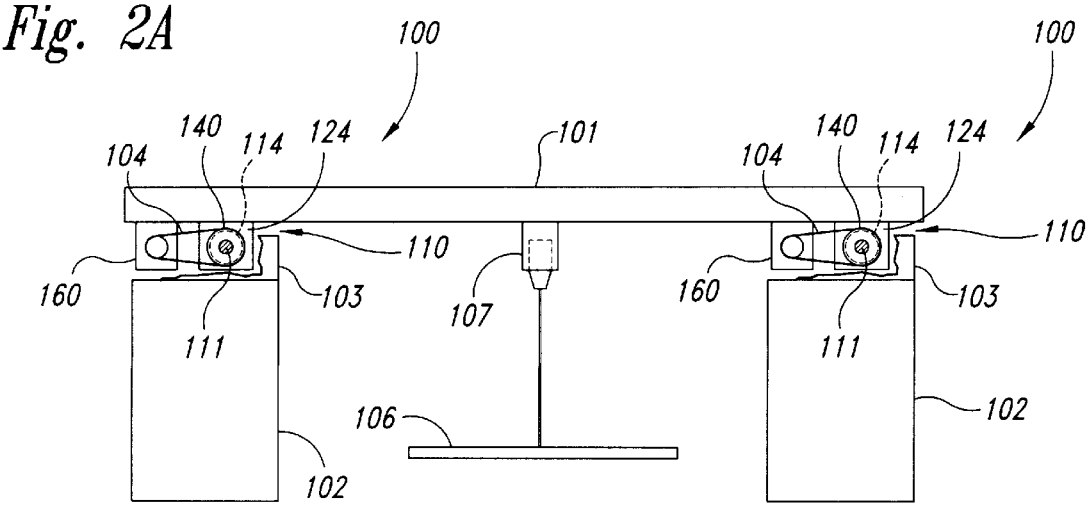
FIG. 2B is side view of a waterjet cutting machine having two screw drives in accordance with another embodiment of the invention.

FIG. 2A is an end view of a waterjet cutting apparatus 110 having a beam 101 movably connected to a support 102. The beam 101 includes a nozzle 107 that directs a high pressure waterjet to a workpiece 106 positioned below. The beam 101 may be attached to a single support 102 with a single screw drive apparatus 110, or, at shown in FIG. 2B, the beam may be attached to a pair of spaced-apart supports 102 with a corresponding pair of screw drive apparatuses 110. Referring to FIGS. 2A and 2B, the apparatus 110 may include a threaded rod 111 that extends perpendicular to the plane of the figures and may be connected to the support 102 at each end with a bracket 103, shown partially cut away. The apparatus 110 may further include a nut 114 that engages the threaded rod 111 and is connected to the beam 101 with a housing 124. The nut 114 is rotatably driven by a pulley 140 connected with a belt 104 to a drive means 160, such as a motor. As the drive means 160 rotates the pulley 140 and the nut 114, the beam 101 is driven linearly perpendicular to the plane of FIGS. 2A and 2B to cut a pattern in the workpiece 106.

Figure 1:
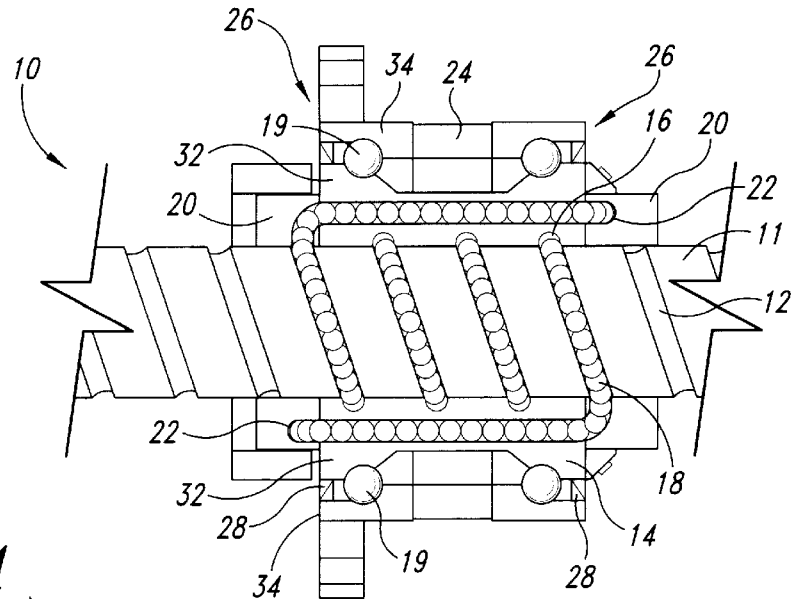
FIG. 1 is a partial cross-sectional view of a screw drive in accordance with the prior art.
Figure 3:
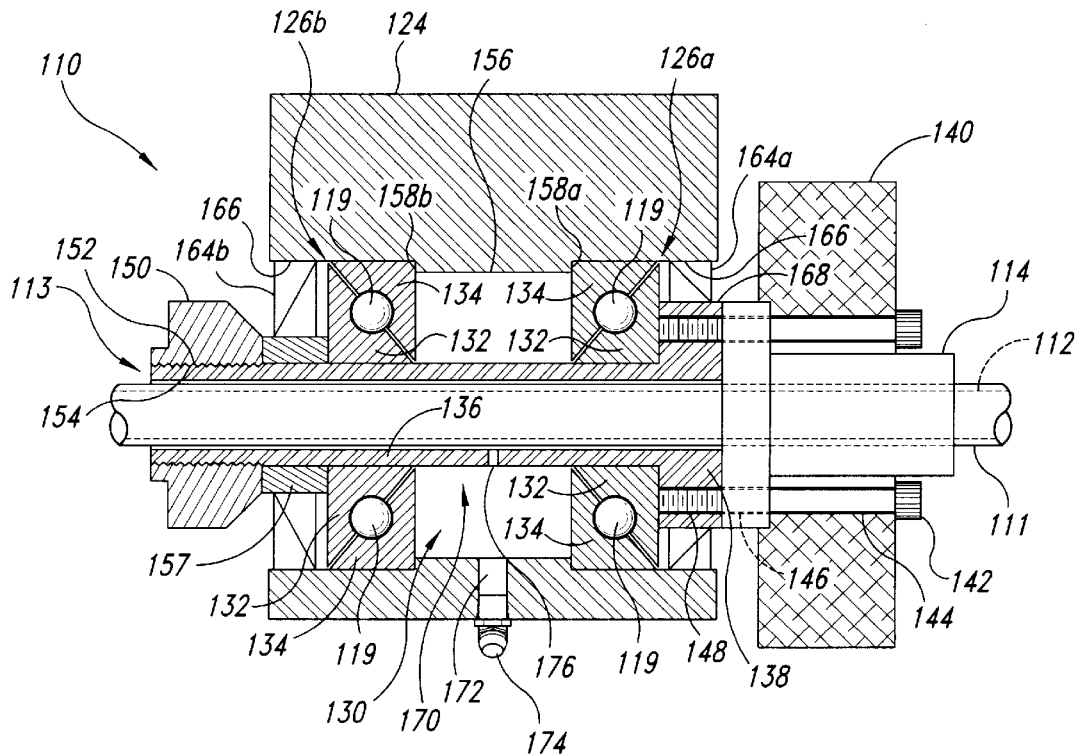
FIG. 3 is a cross-sectional side view of the screw drive apparatus shown in FIG. 2A.

FIG. 3 is a cross-sectional side view of the apparatus 110 shown in FIG. 2A. As shown in FIG. 3, the threaded rod 111 has a helical thread 112 that engages a corresponding spiral channel in the nut 114, as described above with reference to FIG. 1. The nut 114 is connected to the pulley 140 and to a drive shaft 136 with pulley bolts 142. The pulley bolts 142 extend through first bolt holes 144 in the pulley 140, through second bolt holes 146 in the nut 114, and engage threaded holes 148 in a flange 138 of the drive shaft 136. Accordingly, the pulley bolts 142 connect the pulley 140, the nut 114, and the drive shaft 136 in a generally rigid manner. The drive shaft 136 is concentric with the threaded rod 111, and has an annulus 113 through which the threaded rod 111 extends. The housing 124 is concentric with both the threaded rod 111 and the drive shaft 136 and has a passageway 130 through which the threaded rod 111 and the drive shaft 136 extend.

First and second spaced apart support bearings 126 (shown in FIG. 3A as 126a and 126b) are positioned within the passageway 130 between the drive shaft 136 and the housing 124. Accordingly, the housing 124 may include a bearing divider 156 having a first lateral face 158a adjacent the first support bearing 126a and a second lateral face 158b opposite the first lateral face 156a and adjacent the second support bearing 126b. The support bearings 126 may be spaced apart by a distance sufficient to prevent the housing 124 from rocking or canting relative to the drive shaft 136. In one embodiment, the support bearings 126 may include angular contact bearings having an outer race 134 adjacent the housing 124, an inner race 132 adjacent the drive shaft 136, and balls 119 between the inner and outer races. In other embodiments, the balls 119 may be replaced with rollers, such as tapered rollers. In still further embodiments, the support bearings 126 may include other types of bearings that similarly allow rotational motion of the drive shaft 136 relative to the housing 124.

A retaining member 150 is removably connected to the drive shaft 136 opposite the flange 138. In one embodiment, shown in FIG. 3A, the retaining member 150 may include a locknut having internal threads 152 that threadedly engage external threads 154 of the drive shaft 136. In other embodiments, other means may be used to movably engage the retaining member 150 with the drive shaft 136. A spacer 157 may be positioned annularly about the drive shaft 136, between the retaining member 150 and the second support bearing 126b. As the retaining member 150 is moved along the drive shaft 136, it imparts a compressive force through the spacer 157 to the second support bearing 126b in the direction generally along the axis of the threaded rod 111.

Alternatively, the spacer 157 may be formed integrally with the retaining member 150, which then contacts the second support bearing 126b directly, as discussed below with respect to FIGS. 4 and 5. In either case, as the retaining member 150 is adjustably tightened, the second support bearing 126b may be preloaded or compressed between the retaining member 150 and the second lateral face 158b of the bearing divider 156. Simultaneously, the first support bearing 126a may be compressed between the flange 138 of the drive shaft 136 and the first lateral face 158a of the bearing divider 156. Accordingly, both axial and radial gaps between the components of the support bearings 126 may be reduced and/or eliminated as the retaining member 150 is tightened.

In an alternate embodiment, the outer races 134 of the support bearings 126 may be rigidly mounted to the housing 124, for example with epoxy or weldments, so that only the inner races 132 and the balls 119 are biased as the retaining member is tightened. An advantage of this arrangement is that it may eliminate the need for the bearing divider 156. Conversely, the bearing divider 156 may be advantageous because it allows the support bearings 126 to be more easily removed for servicing or replacement.

The apparatus 110 may also include two seals 164 (shown in FIG. 3 as 164a and 164b) disposed within the passageway 30 at opposite ends thereof. One seal 164a sealably engages both an outer surface 168 of the flange 138 and an inner surface 166 of the housing 124 toward the first support bearing 126a. The other seal 164b sealably engages both the spacer 157 and the inner surface 166 of the housing 124 toward the second support bearing 126b. A grease reservoir 170 may be formed within passageway 30, and may be defined by the seals 164, the housing inner surface 166, the spacer 157, and an outer surface of the drive shaft 136. The grease reservoir 170 may be filled with grease or other lubricants through a hole 172 in the housing 124 with a conventional grease fitting 174. Lubricating grease may then flow from the grease reservoir 170, through a weep port 176 provided in the drive shaft 136 and to the threaded rod 111. Accordingly, both the nut 114 and the support bearings 124 may be lubricated as the nut 114 and the housing 124 traverse back and forth along the threaded rod 111.

In operation, a preload force may be applied to the support bearings 126 by tightening the retaining member 150 until it biases the first support bearing 126a against the flange 138, and the second support bearing 126b against the bearing divider 156. The nut 114 may then be rotated to move the housing 124 linearly along the threaded rod 111. The retaining member 150 may be subsequently tightened or loosened to vary the compressive forces on the support bearings 126, or the retaining member may be removed to access the support bearings 126.

Alternatively, the threaded rod 111, rather than the nut 114, may be rotated, thereby driving the nut and providing the desired rectilinear motion of housing 124 along threaded rod 111. However, as the length of threaded rod 111 and/or the angular velocity of the threaded rod increase, the threaded rod may oscillate in an undesirable manner. In addition, the threaded rod 111 may have more inertia than the nut 114 and may require more power to rotate. Furthermore, the apparatus 110 will be stiffer if the threaded rod is fixed at both ends. It may therefore be preferable in waterjet cutting tool devices to rotate the nut 114, as discussed above.

An advantage of an embodiment of the apparatus 110 shown in FIGS. 2A–3 is that the support bearing 126 may be easily preloaded by tightening the retaining member 150. The retaining member 150 may be tightened without disassembling any of the components comprising the apparatus 110. A further advantage is that the housing 124 may be removed (by removing the retaining member 150) to gain access to the support bearings 126 without disturbing the nut 114 or the pulley 140. Accordingly, the apparatus 110 may be easier to service and maintain than conventional devices in which the support bearings and the nut are integrally coupled. Yet a further advantage is that elements of both the support bearings 126 and the nut 114 may be lubricated from a single reservoir. Still a further advantage is that the support bearings 126 and the housing 124 may be manufactured independently of the nut 114. Accordingly, users requiring a nut and support bearing in combination need not be restricted by the limited array of such combinations, but rather may combine a housing and a support bearing with any number of nuts. Furthermore, the support bearings 126 may have a non-linear stiffness such that as the load on the bearings increases, the stiffness of the bearings increases. Accordingly, by preloading the support bearings 126, the stiffness and natural frequency of the apparatus 110 may increase, improving the response of the system to vibrations.

Figure 4:
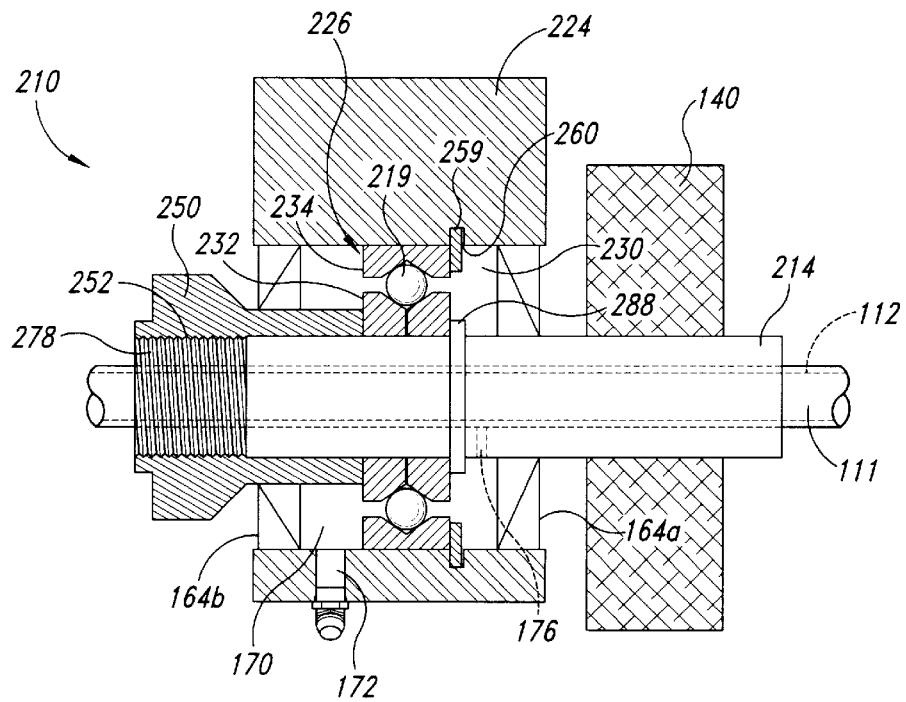
FIG. 4 is cross-sectional side view of an apparatus in accordance with another embodiment of the present invention having a single support bearing and a retaining member threadedly engaging a nut.

FIG. 4 is a cross-sectional side view of a screw drive apparatus 210 having a single support bearing 226 disposed in a passage 230 of a housing 224 in accordance with another embodiment of the invention. The support bearing 226 may be a cross-type bearing having an outer race 234 and a split inner race 232. Balls 219, or alternatively rollers, may be positioned between the outer race 234 and the inner race 232. One end of the outer race 234 may be positioned adjacent a retaining ring 259 that is received in a corresponding slot 260 in the housing. One end of the inner race 232 may be positioned adjacent a bearing flange 288 that extends radially outward from a nut 214 disposed about the threaded rod 111 in generally the same manner as discussed above with reference to FIG. 1. The opposite end of the inner race 232 may be positioned against a retaining member 250. The retaining member 250 has internal threads 252 that threadedly engage a threaded portion 278 of the nut 214. As the retaining member 250 is tightened against the support bearing 226, a preload force is adjustably imparted to the support bearing 226, compressing the support bearing against the retaining ring 259 and the bearing flange 288. Alternatively, the outer flange 234, rather than the inner flange 232, may be split and the retaining member 250 may engage the outer race 234.

An advantage of the screw drive apparatus 210 shown in FIG. 4 when compared with the apparatus 110 shown in FIG. 3 is that it may be simpler to construct and maintain because it eliminates one support bearing and does not require a drive shaft 136. Furthermore, the passage 230 through the housing 224 may be more accurately machined because it includes a single bore rather than two opposing bores that are separated by a bearing divider 156 (FIG. 3) and that may be difficult to align with each other. Conversely, an advantage of the apparatus 110 is that the two support bearings 126 may more securely support the housing 124 relative to the threaded rod 111.

Figure 5:
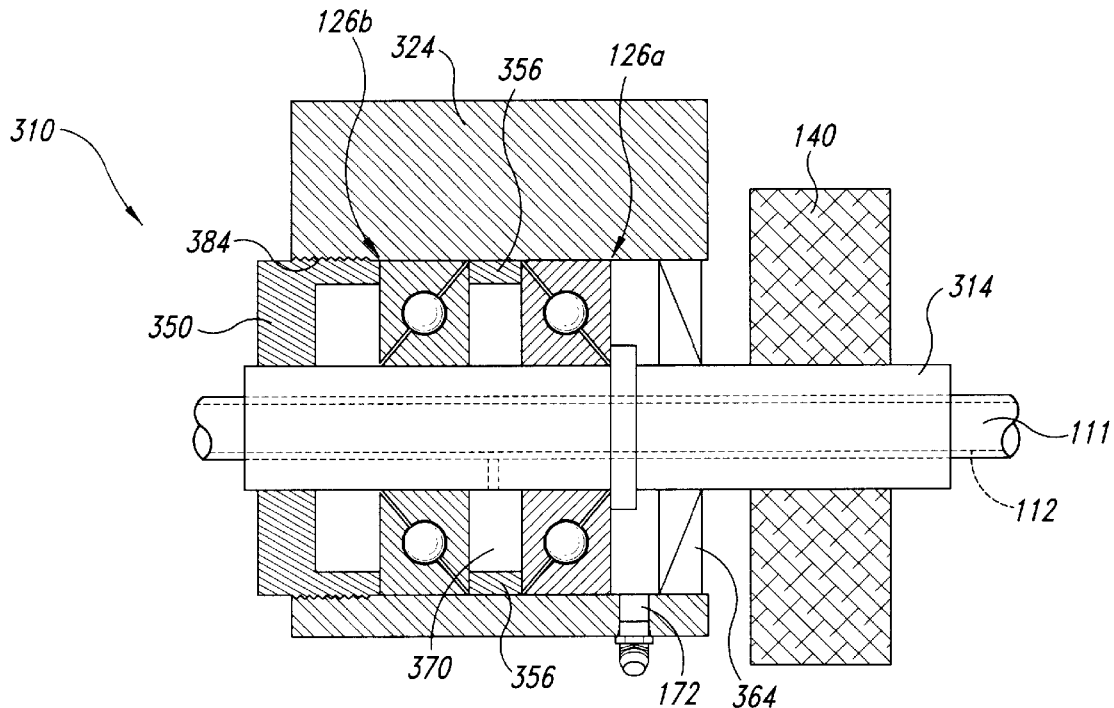
FIG. 5 is cross-sectional side view of an apparatus in accordance with still another embodiment of the present invention having two support bearings and a retaining member threadedly engaging a housing.

FIG. 5 is a cross-sectional side view of a screw drive apparatus 310 having a retaining member 350 that threadably engages a threaded portion 384 of a housing 324. The housing 324 is positioned concentrically about a nut 314, which is in turn positioned concentrically about the threaded rod 111, generally as discussed above with reference to FIG. 4. The retaining member 350, nut 314 and housing 324, together with a seal 364, define a grease reservoir 370 that operates in a manner generally similar to that discussed above with reference to FIG. 3.

As the retaining member 350 is adjustably tightened, it imparts an axial force to the second support bearing 126b, which in turn imparts an axial force to the first support bearing 126a via a sliding bearing divider 356. An advantage of the sliding bearing divider 356 when compared to the fixed bearing divider 156 discussed above with reference to FIG. 3 is that it may accommodate bearings having a variety of axial dimensions.

Figure 6:
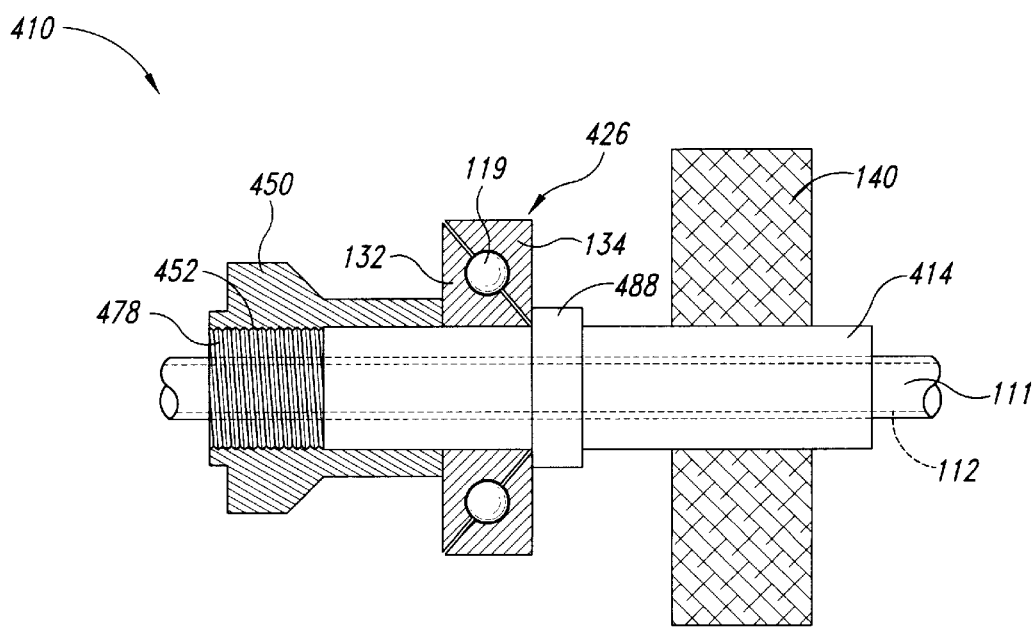
FIG. 6 is a cross-sectional side view of an apparatus in accordance with yet another embodiment of the invention having a single support bearing.

FIG. 6 is a cross-sectional side view of a screw drive apparatus 410 having a single support bearing 426 positioned adjacent a nut 414. The nut 414 may have a bearing flange 488 adjacent the support bearing 426 and a threaded end 478 spaced apart from the bearing flange. A retaining member 450 having internal threads 452 threadedly engages the threaded end 478, such that the retaining member 450 contacts the support bearing 426. As the retaining member 450 is adjustably tightened, it imparts a preload force to the support bearing 426, compressing the support bearing 426 against the bearing flange 488.

As shown in FIG. 6, the apparatus 410 does not include a housing 124 (FIG. 3). Instead, devices such as the waterjet support beam 101 (FIG. 2A) may be coupled directly to the outer race 134 of the support bearing 426.

Figure 7A:
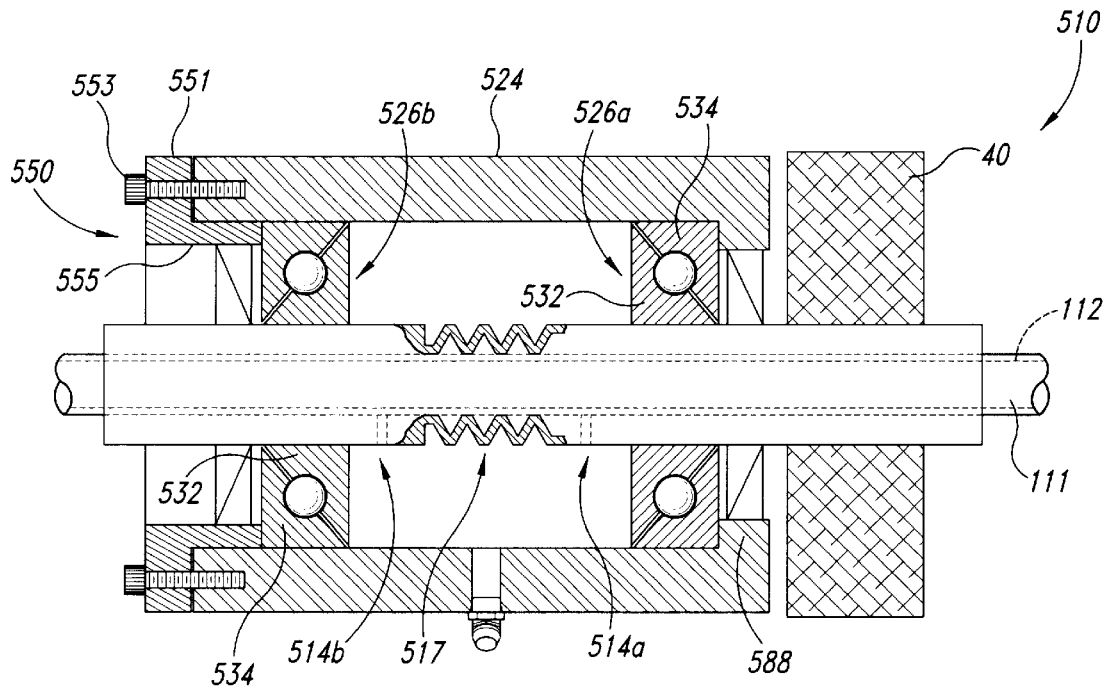
FIG. 7A is a cross-sectional view of an apparatus having two nuts joined by a coupling member in accordance with another embodiment of the invention.

FIG. 7A is a cross-sectional side view of a drive apparatus 510 having first and second nuts 514 (shown as 514a and 514b) engaged with the threaded rod 111. The nuts 514 may be coupled with a coupling member 517 that extends axially between the nuts. In one embodiment, the coupling member 517 may be integrally formed with the nuts 514 and may be generally rigid in a torsional direction and flexible and resilient in the axial direction. Accordingly, the coupling member 517 may transmit axial forces between the nuts 514 while at least restricting rotational motion of one nut relative to the other.

The drive apparatus 510 further includes a housing 524 annularly disposed about the nuts 514, and first and second support bearings 526 (shown as 526a and 526b), each having an outer race 534 adjacent the housing 524 in an inner race 532 adjacent one of the nuts 514. A retaining member 550 may be coupled to the housing 524 to apply an axial load to the support bearings 526 and the nuts 514. In one embodiment, the retaining member 550 may include a collar 551 having a flange 555 in contact with the second support bearing 526b. The collar 551 may be biased against the second support bearing 526b by tightening screws 553 that couple the collar 551 to the housing 524.

As the retaining member 550 is biased axially against the second support bearing 526b, the second support bearing transmits the axial force to the second nut 514b, thereby applying a load to the balls contained within the second nut. The axial load is then transmitted via the coupling member 517 to the first nut 514a. The first nut 514a transmits the axial force to the first support bearing 526a, which is clamped between the first nut 514a and the bearing flange 588. Accordingly, an advantage of the apparatus 510 shown in FIG. 7A is that by adjusting the retaining member 550, a preload may be applied to both the support bearings 526 and the nuts 514. By applying a preload to both the support bearings 526 and the nuts 514, the apparatus 510 may reduce and/or eliminate gaps between elements of the nuts and the bearings, and may improve the accuracy with which the housing 524 is positioned relative to the threaded rod 111.

Figure 7B:
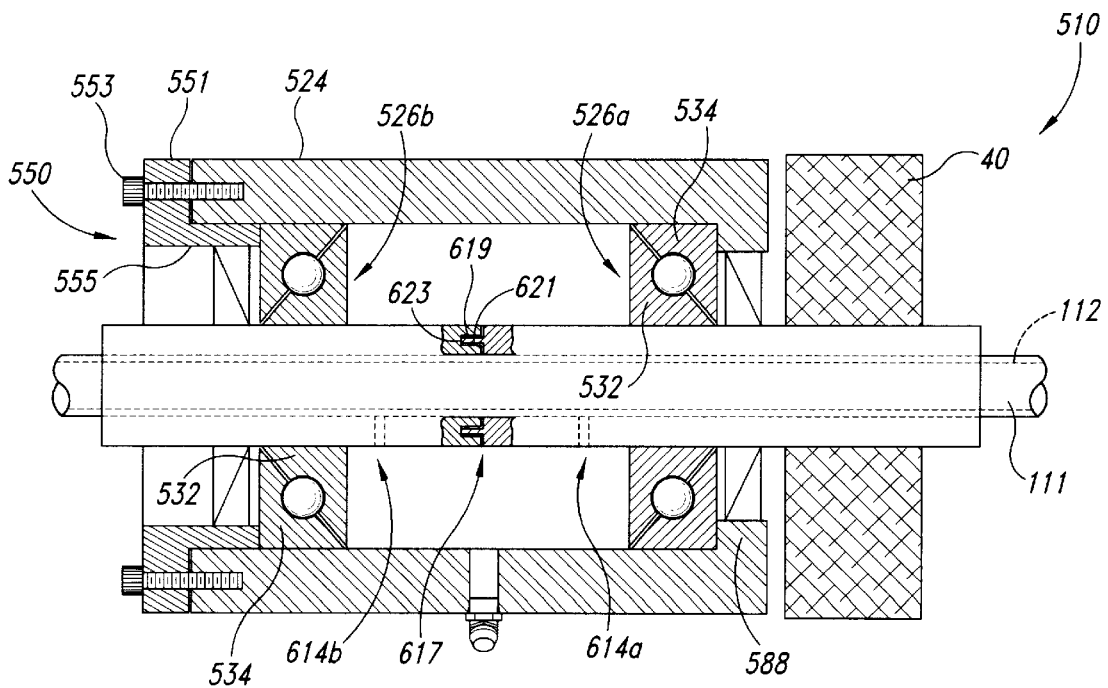
FIG. 7B is a cross-sectional side view of an apparatus having two nuts joined by a rigid coupling member in accordance with still another embodiment of the invention.

FIG. 7B is a cross-sectional side view of another embodiment of the apparatus 510 wherein a first nut 614a is coupled to a second nut 614b with a coupling member 617. The coupling member 617 may include a plurality of spaced apart teeth or splines 621 projecting axially from the first nut 614a. The splines 621 may be received in corresponding slots 619 in the second nut 614b. The splines 621 transmit radial motion from one nut 614 to the other and transmit axial forces between the nuts 614 by engaging with end surfaces 623 of each slot 619. As shown in FIG. 7B, the nuts 614 may be separated from each other by removing the splines 621 from the slots 619. Accordingly, an advantage of the apparatus 510 shown in FIG. 7B is that one of the nuts 614 may be removed and/or replaced without removing and/or replacing the other nut 614.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A screw drive apparatus for positioning a waterjet cutting device, comprising:

a threaded rod having a longitudinal axis and at least one helical thread;

a nut disposed about the threaded rod, the nut having a channel aligned with and radially outward from the helical thread, the nut further having a plurality of balls engaging the helical thread of the threaded rod, the nut being rotatable relative to the threaded rod;

a drive shaft disposed about the threaded rod, the drive shaft having a first end and a second end, the first end being connected to the nut;

a housing having a passage therethrough and at least one support bearing positioned within the passage, the support bearing having an inner race attached to the drive shaft and an outer race attached to the housing, the inner race being rotatable relative to the outer race;

drive means coupled to the nut to rotate the nut on the threaded rod and move the housing along the longitudinal axis of the threaded rod; and a retaining member removably attached to the drive shaft proximate the second end thereof, the retaining member being coupled to the support bearing and movable relative to the support bearing to apply an adjustable force on the support bearing in a direction generally parallel to the longitudinal axis.

2. The apparatus of claim 1 wherein the second end of the drive shaft has threads thereon and the retaining member includes a locknut threadedly engaging the threads of the drive shaft.

3. The apparatus of claim 1 wherein the passage has an inner surface, the drive shaft has an outer surface facing the inner surface of the passage, and the retaining member has an end surface facing the first inner surface of the passage, the apparatus further comprising:

a first seal disposed within the passage and sealably engaging the inner surface of the passage and the outer surface of the drive shaft;

a second seal disposed within the passage and sealably engaging the inner surface of the passage and the outer surface of the drive shaft, the support bearing being between the first and second seals, wherein the inner surface, the outer surface, the end surface, and the seals define a reservoir for retaining a lubricant.

4. The apparatus of claim 3 wherein the housing has a hole in fluid communication with the reservoir to allow lubricant to enter the reservoir.

5. The apparatus of claim 3 wherein the drive shaft has a port in fluid communication with the reservoir to allow lubricant from the reservoir to engage the threaded rod.

6. The apparatus of claim 1, further comprising at least one spacer disposed between the retaining member and the support bearing.

7. The apparatus of claim 1 wherein one surface of the support bearing is coupled to the retaining member and an opposite surface of the support bearing engages the housing.

8. The apparatus of claim 1 wherein one surface of the support bearing is coupled to the retaining member and an opposite surface of the support bearing engages the nut.

9. A screw drive apparatus for positioning a waterjet cutting device comprising:

a threaded rod having a longitudinal axis and at least one helical thread;

a first and second nuts disposed about the threaded rod, each nut having a channel aligned with and radially outward from the helical thread, each nut further having a plurality of balls engaging the helical thread of the threaded rod, each nut being rotatable relative to the threaded rod;

a coupler extending between and coupling the first and second nuts;

a housing disposed about the first and second nuts;

a first support bearing between the first nut and the housing, the first support bearing having an inner race adjacent the first nut and an outer race adjacent the housing;

a second support bearing between the second nut and the housing, the second support bearing having an inner race adjacent the second nut and an outer race adjacent the housing; and a retaining member removably attached to the housing and being coupled to the first support bearing and movable relative to the first support bearing to apply an adjustable force on the first support bearing, the coupler, and the second support bearing in a direction generally parallel to the longitudinal axis.

10. The apparatus of claim 9 wherein the retaining member includes a collar adjacent the first support bearing and a threaded fastener connecting the collar to the housing.

11. The apparatus of claim 9 wherein the coupler includes an axially resilient, flexible member between the first nut and the second nut.

12. The apparatus of claim 4 wherein the coupler is integrally formed with the first and second nuts.

13. The apparatus of claim 9 wherein the coupler includes a spline member attached to the second nut configured to be received by a corresponding aperture in the first nut.

* * * * *